Patented Mar. 19, 1940

2,194,213

UNITED STATES PATENT OFFICE 2,194,213

DYESTUFFS OF THE CYANINE SERIES

Gustav Wilmanns, Wolfen, Kreis Bitterfeld, Walter Dieterle, Dessau-Ziebigk, and Hermann Kobs, Berlin-Charlottenburg, Germany, assignors, by mesne assignments, to General Aniline & Film Corporation, New York, N. Y., a corporation of Delaware No Drawing. Application January 19, 1938, Serial No. 185,656. In Germany January 25, 1937

4 Claims. (Cl. 260—240)

Our present invention relates to new cyanine dyestuffs.

One of its objects is to provide a cyanine dyestuff containing in its molecule heterocyclic rings derived from 4- or 5-aminothionaphthene. Another object is the provision of a process of producing a cyanine dyestuff containing in its molecule such heterocyclic rings. Further objects of the invention will be apparent from the detailed description following hereinafter.

Heterocyclic bases from 4-aminothionaphthene and 5-aminothionaphthene having reactive methyl groups have not become known. According to the invention the corresponding thiazoles, selenazoles and quinaldines are produced which may be converted in known manner into cyanine dyestuffs of all the known types, especially pseudocyanines, isocyanines, tri-, penta-, hepta-, nona- and undecacyanines. Unsymmetrical cyanines as well as styryl dyestuffs can also be made.

The invention consists in making thiazoles by converting the acetyl compound of 4- or 5-aminothionaphthene into the thio-aceto-compound by means of phosphoruspentasulfide and oxidizing the thio-aceto-compound in alkaline solution with potassium ferricyanide to produce the ring. The two aminothionaphthene serving as parent material are described in "Annalen der Chemie", vol. 527, pages 92–108, and are supposed to be of the following formulae:

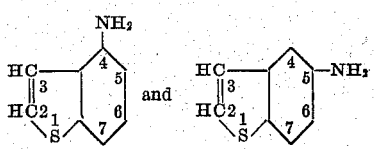

The thiazoles made as outlined above have the constitution

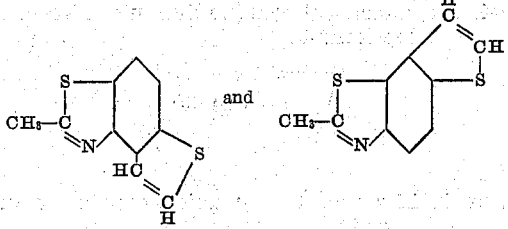

They are similar in their properties to the thiazoles from α- and β-naphthylamine respectively.

If, instead of thiazoles, the corresponding selenazoles of 4- or 5-aminothionaphthene are required, then phosphoruspentaselenide is substituted for the phosphoruspentasulfide.

The invention also consists in the manufacture of quinaldines by causing the 4- or 5-aminonaphthene to react with paraldehyde in presence of hydrochloric acid in the manner prescribed by Döbner and Miller ("Berichte" vol. 14, page 2816; vol. 16, page 1664; vol. 17, page 1718).

The foregoing bases are converted in known manner into quaternary salts, for example into ethyliodides, which bases can be caused to react to form cyanine dyestuffs exactly as are the quaternary salts of methylnaphthothiazoles. The tri- and penta- methinecyanines are made by the process of the U. S. Patent No. 1,524,791 with the aid of ortho-esters or β-ethoxyacroleinacetale in pyridine, the pseudocyanines by the process of the U. S. patent application Ser. No. 679,264 filed July 6, 1933, the isocyanines by reaction with quaternary salts of quinoline in presence of alcohol and a strong base, the styryl dyestuffs by reaction with dialkylaminobenzaldehyde and the functional derivatives thereof in the presence of piperidine.

The production of heptacyanines can be carried out in analogy to the prescriptions given in the following patents: British Patents Nos. 354,826 and 351,555, U. S. Patents Nos. 1,863,679 and 1,878,557.

Likewise nona- and undecacyanines may be produced from the new thiazole-bases according to the method described in the British Patent No. 441,624 (U. S. Patent Application Ser. No. 736,131).

The cyanine dyestuffs made by this invention are all of use as photographic sensitizers although they are not all of the same quality in this respect. In their properties they closely resemble the corresponding known cyanine dyestuffs which are derived from naphthylamines.

The following are examples of the sensitizing properties of some of the groups of dyes in question:

Trimethinecyanines from the thiazole derived from 5-aminothionaphthene: sensitizing maximum about 6150 Å. U.; pronounced gap in the green region.

Trimethinecyanines from the thiazole derived from 4-aminothionaphthene: sensitizing maximum about 6250 Å. U.

Isocyanines from the thiazole derived from 5-aminothionaphthene and para-toluoquinoline ethyliodide: sensitizing maximum about 5400 Å. U.

Pseudocyanines from the thiazole derived from 5-amino-thionaphthene and N-ethyl-para-toluo-thioquinolone-alkyl-iodide: sensitizing maximum about 5250 Å. U.

Pentamethinecyanines from the thiazole derived from 5-aminothionaphthene: sensitizing maximum about 7200 Å. U.

Heptamethinecyanines from the thiazole derived from 5-aminothionaphthene: sensitizing maximum about 8500 Å. U.

The following are examples of the invention:

*Example 1.*—10 grams of a compound

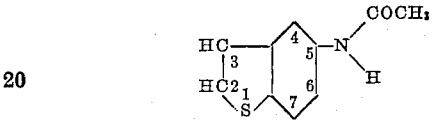

(described in Annalen der Chemie, vol. 527, page 97) are dissolved in 100 cc. of boiling benzene; there are then added gradually 6 grams of phosphoruspentasulfide (finest powder) and the whole is boiled for half an hour under reflux. It is then filtered hot; on cooling a part of the thioacetaminothionaphthene which has been formed crystallizes. A further quantity may be obtained by extraction with caustic soda lye of 2 per cent strength and subsequent precipitation by adding acetic acid to the extract.

5-acetamino-thionaphthene used as starting product may be also reacted with phosphoruspentasulfide in absence of a solvent, the components being intimately mixed and melted on a vapor bath. This melted product is extracted with alcohol. To the alcoholic solution there is then added caustic soda lye of 2 per cent in excess. After short time of standing the undissolved impurities are filtered off and the thio-aceto-compound is precipitated from the filtrate by passing through a current of carbon dioxide.

10 grams of this thio-aceto-compound are dissolved in 400 cc. of caustic soda lye of 2 per cent strength and the solution is poured into 170 cc. of potassium ferricyanide solution of 20 per cent strength; there is thus precipitated a brownish precipitate of 2-methylthionaphthene thiazole. This base is purified by means of its ferrocyanide. The pure base is changed in the usual manner into the ethyl-sulfo ethylate.

1 gram of the ethyl-sulfo-ethylate is mixed with 3 cc. of pyridine and 1 cc. of ethyl-orthoformate, and the mixture is kept for one hour closely below the boiling point of the pyridine. The deep red-violet solution thus obtained is mixed with a solution of potassium bromide, whereby a dyestuff is precipitated which has the formula:

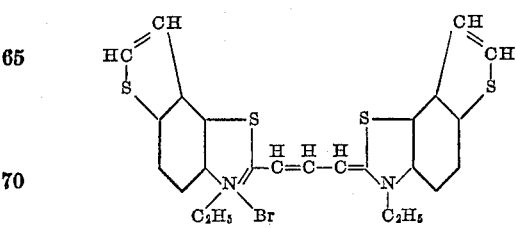

Maximum absorption in methanol about 5780 Å. U. Sensitizing maximum 6100 Å. U.

*Example 2.*—A product of the following formula will be obtained

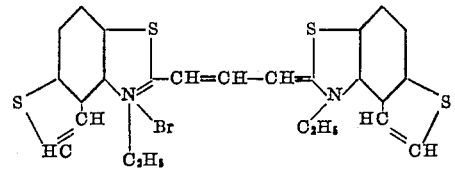

if under exactly the same conditions otherwise 10 grams of 4-acetaminothionaphthene is employed as a starting material.

*Example 3.*—The corresponding seleno-cyanine

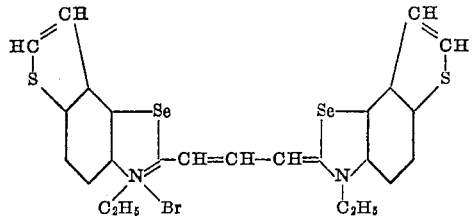

is obtained from 10 grams of 5-acetaminothionaphthene by substituting phosphoruspentaselenide for the phosphoruspentasulfide of Example 1.

We claim:

1. A cyanine deystuff corresponding with the formula

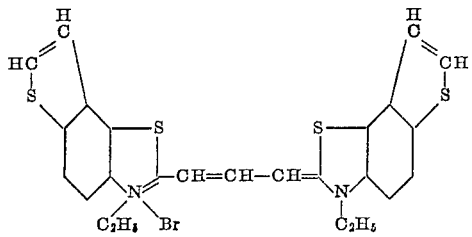

2. A cyanine dyestuff corresponding with the formula

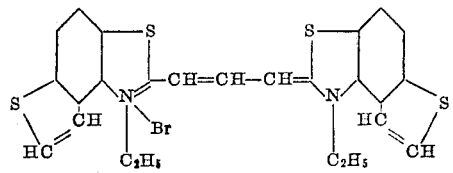

3. A cyanine dyestuff corresponding with the formula

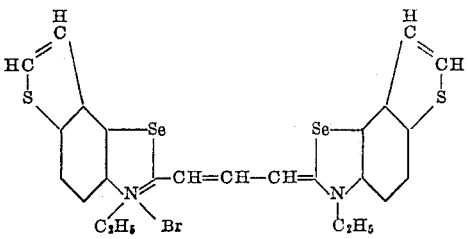

4. A symmetrical cyanine dyestuff corresponding with the formula

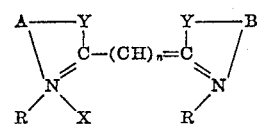

wherein X stands for an anion capable of precipitating the dye,
Y stands for a member selected from the group consisting of S, Se and CH=CH, R stands for alkyl,
n stands for a member selected from the group consisting of 1, 3, 5, 7, 9 and 11,
A stands for a member selected from the group consisting of
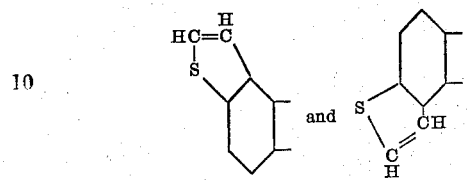
B stands for a member selected from the group consisting of
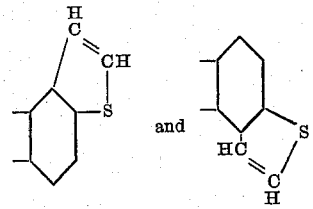
GUSTAV WILMANNS.
WALTER DIETERLE.
HERMANN KOBS.